United States Patent [19]

Fujii et al.

[11] 4,035,559

[45] July 12, 1977

[54] NOVEL AROMATIC POLYVINYL COMPOUNDS

[75] Inventors: Yoshikazu Fujii, Shiga; Shuichi Kanagawa, Osaka; Kazuhiko Hata, Ibaraki, all of Japan

[73] Assignee: Sumitomo Chemical Company, Limited, Osaka, Japan

[21] Appl. No.: 693,695

[22] Filed: June 7, 1976

[30] Foreign Application Priority Data

June 5, 1975 Japan .................. 50-68449
June 18, 1975 Japan .................. 50-74808

[51] Int. Cl.² ........................ C07C 69/83
[52] U.S. Cl. ........................ 526/56; 260/31.8 DR; 260/31.8 B; 260/468 G; 260/468 K; 260/475 PN; 260/479 S
[58] Field of Search ..... 260/475 PN, 479 S, 468 K; 526/56

[56] References Cited

U.S. PATENT DOCUMENTS

3,655,731  4/1972  Richter ................. 260/479 S

*Primary Examiner* — Paul R. Michl
*Attorney, Agent, or Firm* — Stevens, Davis, Miller & Mosher

[57] ABSTRACT

A compound of the formula (1),

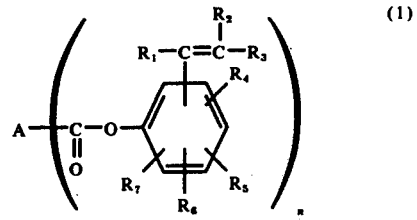

wherein $R_1$, $R_2$, $R_3$, $R_4$, $R_5$, $R_6$ and $R_7$ are individually a hydrogen atom or a $C_1$-$C_{20}$ alkyl group, A is a hydrocarbon residue, and $n$ is an integer of 2 or 3, provided that when $R_1$ is a methyl group and each of $R_2$, $R_3$, $R_4$, $R_5$, $R_6$ and $R_7$ is a hydrogen atom, the isopropenyl group

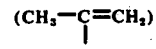

is substituted at o- or m-position to the oxycarbonyl group

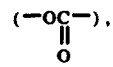

which is useful as a crosslinking plasticizer for rubber.

28 Claims, No Drawings

NOVEL AROMATIC POLYVINYL COMPOUNDS

The present invention relates to novel aromatic polyvinyl compounds and a method for the preparation thereof.

Hitherto, an aromatic polyvinyl compound having two or more vinyl groups such as divinyl benzene, trivinyl benzene and the like are well known. The commonly known compounds having two or more vinyl groups include polyene-hydrocarbons, unsaturated esters of acrylic acid (e.g. allyl acrylate, crotyl acrylate) and acrylic esters of polyols. This kind of compounds has been used as a peroxide coagent in crosslinking of rubber and as a crosslinking agent in molding of unsaturated polyesters. Further, these compounds have been used as a crosslinking agent for crosslinked polymers such as crosslinked polystyrene beads and applied to ion-exchange resins, macro porous polymeric adsorbents and the like.

However, these well-known compounds, particularly the well-known aromatic polyvinyl compounds are not always satisfactory in terms of handling or the physical properties of articles prepared therefrom. For example, most of the well-known compounds are liquid at room temperature and easily evaporate with a characteristic odor. Therefore, when they are used as a crosslinking agent for unsaturated polyesters or elastomers, their vapors are ready to leak and give an offensive odor in use.

At the present time, in the crosslinking of unsaturated polyesters or elastomers using crosslinking agents the leak of offensive odor becomes a serious environmental pollution. Consequently, for maintaining the health of workers and the persons around them, crosslinking agents having low degrees of volatility and offensive odor are strongly desired. Further, when divinyl benzene is used as a crosslinking agent, the resulting products become hard and brittle. This is due to the fact that the divinyl benzene has the benzene nucleus having an extremely rigid chemical structure, and there are two vinyl groups through only one benzene nucleus to result in a short crosslinking distance. Consequently, it is strongly desired to synthesize flexible crosslinking polymers by replacing the rigid structure by the flexible one.

In order to overcome these defects of the conventional compounds, the inventors have extensively studied to synthesize the aromatic compounds having two or more vinyl groups which have excellent properties, and have found that ester compounds resulting from hydroxystyrene compounds and polycarboxylic acids have an excellent property as a crosslinking agent for elastomers, resins for molding or paints, and are suitable for the preparation of crosslinking polymers having different degrees of flexibility. Further it was found that, when they are used as a plasticizer in a rubber processing, they exhibit an excellent plasticizing effect and moreover effectively serve as the so-called crosslinking plasticizer which improves the physical properties of vulcanized rubber by the reaction between the plasticizer and the rubber in the course of vulcanization. The ester compounds can be used not only for crosslinking but also for many other applications. The most remarkable characteristics of the ester compounds consist in an extremely low degree of volatility and freedom from an offensive odor in handling.

The present invention provides a novel aromatic polyvinyl compound of the formula (1),

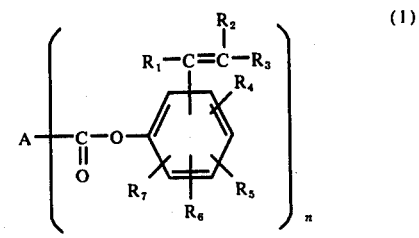

wherein $R_1$, $R_2$, $R_3$, $R_4$, $R_5$, $R_6$ and $R_7$ are individually a hydrogen atom or a $C_1$–$C_{20}$ alkyl group, A is a hydrocarbon residue, and n is an integer of 2 or 3, provided that when $R_1$ is a methyl group and each of $R_2$, $R_3$, $R_4$, $R_5$, $R_6$ and $R_7$ is a hydrogen atom, the isopropenyl group

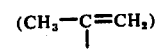

is located at o- or m-position to the oxycarbonyl group

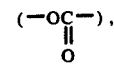

and a method for producing said novel aromatic polyvinyl compound of the formula (1), which comprises reacting a phenol compound of the formula (2),

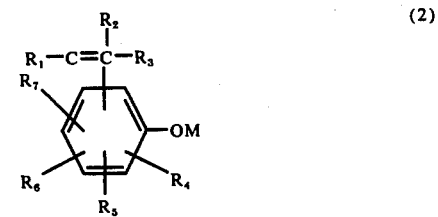

wherein $R_1$, $R_2$, $R_3$, $R_4$, $R_5$, $R_6$ and $R_7$ are as defined above and M is a hydrogen atom or an alkali metal belonging to Group I of Mendelejeff's Periodic Table, provided that when $R_1$ is a methyl group and each of $R_2$, $R_3$, $R_4$, $R_5$, $R_6$ and $R_7$ is a hydrogen atom, the isopropenyl group

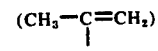

is located at o- or m-position to the -OM group, with a polycarboxylic acid or the reactive derivative thereof of the formula (3),

wherein A and n are as defined above and Y is a hydroxyl group, a $C_1$–$C_{20}$ alkoxy group or a halogen atom, in the presence or absence of a suitable catalyst.

The present invention also provides a rubber composition comprising at least one of ester compounds of the formula (I),

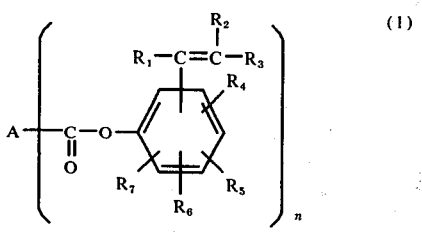

(1)

wherein $R_1, R_2, R_3, R_4, R_5, R_6$ and $R_7$ are individually a hydrogen atom or a $C_1$-$C_{20}$ alkyl group, A is a hydrocarbon residue and n is a integer of 2 or 3.

In the above formulae (1) and (I), a preferred combination of $R_1, R_2, R_3, R_4, R_5, R_6$ and $R_7$ is as follows: $R_1$, $R_2$ and $R_3$ are each a hydrogen atom, a methyl, ethyl, n-propyl or isopropyl group and $R_4, R_5, R_6$ and $R_7$ are each a hydrogen atom or a methyl group. The most preferred combination is as follows: $R_1, R_2$ and $R_3$ are each a hydrogen atom or a methyl group and $R_4, R_5, R_6$ and $R_7$ are each a hydrogen atom. The hydrocarbon residue represented by A may be any, and is preferably an aliphatic residue having 1 to 20 carbon atoms or a residue containing at least one benzene nucleus, and more preferably an aliphatic residue having 1 to 10 carbon atoms or a $C_1$-$C_{20}$ hydrocarbon residue containing at least one benzene nucleus. Specifically, there are exemplified a tetramethylene, trimethylene, phenylene, biphenylene group and the like. The n is, in general, 2. The vinyl group represented by

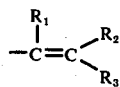

is preferably located at the meta position to the oxycarbonyl group,

As the typical examples of the phenol represented by the formula (2), there are exemplified the following compounds. o-Vinylphenol, m-vinylphenol, p-vinylphenol, o-isopropenylphenol, m-isopropenylphenol, vinylcresols, isopropenylcresols, isopropenyl-vinyl phenols, isopropenyl-isopropyl-phenols, tert-butyl-vinyl-phenols, isopropenyl-nonyl-phenols, ethyl-vinyl-phenols, ethyl-isopropenyl-phenols, dimethyl-vinyl-phenols, ethyl-methyl-vinyl-phenols, dimethyl-isopropenyl-phenols, ethyl-isopropenyl-methyl-phenols and alkali metal salts thereof.

As the typical examples of the polycarboxylic acids and the reactive derivatives thereof (for example halides and esters) represented by the formula (3), there are exemplified the following compounds. Phthalic acid, isophthalic acid, terephthalic acid, maleic acid, fumaric acid, itaconic acid, 3, 6-endomethylene-Δ⁴-tetrahydrophthalic acid, hexachloro-endomethylene-tetrahydrophthalic acid, malonic acid, succinic acid, adipic acid, trimellitic acid, aconitic acid, pyromellitic acid, cyclohexanedicarboxylic acid, adamantanedicarboxylic acid, glutaric acid and the halides and esters thereof.

The compound of the formula (1) can be prepared by mixing the phenol compound of the formula (2) and the polycarboxylic acid or reactive derivative thereof of the formula (3) in an organic solvent or in water and heating the resulting mixture in the presence or absence of a suitable catalyst.

When polycarboxylic acids [corresponding to the formula (3) wherein Y is a hydroxyl group] and phenols [corresponding to the formula (2) wherein M is a hydrogen atom] are used as materials in this reaction, it is desirable to use an aromatic hydrocarbon as a solvent and for example a two-component catalyst such as boric acid-sulfuric acid, boric acid-phosphoric acid or boric acid-p-toluenesulfonic acid and to remove the resulting water in the form of an azeotropic mixture of the water and the organic solvent.

When polycarboxylic acid esters [corresponding to the formula (3) wherein Y is an alkoxy group] and phenols [corresponding to the formula (2) wherein M is a hydrogen atom] are used as materials in this reaction, it is desirable to use, for example, a strong acid such as p-toluenesulfonic acid as a catalyst and to carry out the reaction while allowing the resulting alcohol to be distilled out.

Further, in order to allow this reaction to proceed relatively easily and in a simple operation, it is desirable to use as materials polycarboxylic acid halides [corresponding to the formula (3) wherein Y is a halogen atom] and phenols [corresponding to the formula (2) wherein M is a hydrogen atom]. For example, the compounds of the formula (1) can easily be obtained by mixing phenols of the formula (2) and polycarboxylic acid halides of the formula (3) in an organic solvent capable of dissolving the two components, with no heating. For the purpose of accelerating the reaction and catching the hydrogen halide produced by the reaction, it is preferred to add bases such as N,N-dimethylaniline, triethylamine and the like.

However, the most preferred method by which this reaction can easily be carried out, is the one which uses polycarboxylic acid halides and alkali metal salts of phenols as materials. For example, this reaction can easily be carried out by dissolving the sodium, potassium or lithium salt of phenol compounds represented by the formula (2) in water and the halide of polycarboxylic acids represented by the formula (3) in an organic solvent which is immiscible with water, and contacting the both solutions at the interface thereof. The organic solvents immiscible with water can properly be selected from hydrocarbons, halogenated hydrocarbons, ketones, ethers and the like. Heating is not particularly required for the reaction and good results are obtained at a temperature of less than 50° C, but it is sometimes necessary to heat the reaction solution to some degree in the vicinity of the end point of the reaction, depending upon the kind of compounds of the formula (2). In order to carry out the reaction smoothly, it is important to increase the contacting area between water and the organic solvent by means of thorough stirring. More preferably, the interface can easily be increased by addition of a small amount of cationic surfactant such as trimethylbenzylammonium chloride. In order to prevent the polymerization or oxidation of the phenol of the formula (2) by the action of heat or oxygen, good results are obtained by addition of a trace amount of stabilizers such as sodium hydrosulfite or cuprous chloride. The reaction comes to an end in 3 to 4 hours in general. The objective product can be isolated by removing the aqueous layer from the reaction mixture and evaporating the solvent from the organic solvent layer. Prior to evaporating the organic solvent, it is preferred to wash the organic layer with an alkali and water in order to remove the unreacted materials. The product thus obtained is almost pure so that further purification such as recrystallization is not necessary. However, when pure products are required, it can be achieved by recrystallization from a suitable solvent such as alcohol or ketone.

As the novel aromatic polyvinyl compounds of the formula (1) thus obtained, there are exemplified the following compounds. Bis(vinylphenyl)terephthalates, bis(vinylphenyl)isophthalates, bis(vinylphenyl)phthalates, bis(2- or 3-isopropenylphenyl)terephthalate, bis(2- or 3-isopropenylphenyl)isophthalate, bis(2- or 3-isopropenylphenyl)phthalate, bis(vinylphenyl)adipates, bis(2- or 3-isopropenylphenyl)adipate, bis(vinylphenyl)sebacates, bis(2- or 3-isopropenylphenyl)sebacate, tris(vinylphenyl)trimellitates, tris(2- or 3-isopropenyphenyl)trimellitate, bis(vinylphenyl)maleates, bis(2- or 3-isopropenylphenyl)maleate, bis(vinylphenyl)fumarates, bis(2- or 3-isopropenylphenyl)fumarate, bis(dimethyl-isopropenyl-phenyl)adipates, bis(dimethylisopropenyl-phenyl)terephthalates and tris(dimethylisopropenyl-phenyl)trimellitates.

The aromatic polyvinyl compounds synthesized by the method of the present invention are solid in general and are very widely used as an aromatic polyvinyl monomer. Particularly, the novel aromatic polyvinyl compounds obtained from m-vinylphenols having the vinyl group

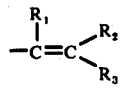

at m-position to the oxycarbonyl group

(e.g. m-vinylphenol, m-isopropenylphenol and the like) or salts thereof as the phenols represented by the formula (2), have favorable physical properties suitable for a wide range of application as compared with the corresponding o- or p-isomers. This is because the compounds resulting from the m-vinylphenols generally have a melting point lower than that of the corresponding p-isomers, and therefore a larger number of compounds which melt at required temperatures with a suitable flowability can be produced than in the case of the p-isomers. Further, as is well known, o- and p-vinylphenols are extremely unstable as compared with m-vinylphenols and easily polymerize into tar. It is apparent therefore that preparation of the compounds from m-vinylphenols is much easier than that of the o- and p-isomers. Moreover, the vinyl group of the o- and p-isomers is unstable as compared with that of the m-isomers so that o- or p-isomers easily polymerize during storage or operations such as processing and kneading, thus changing in properties, while the m-isomers give a desirable crosslinkability only at a designed temperature.

The compounds of the present invention can be used as a crosslinking agent for resins in reinforcement of paints and molded products, and also they are used as a crosslinking agent for elastomers. Further, in a polymer synthesis, good crosslinked polymers can be obtained by copolymerizing a compound of the formula (1). Particularly, the ester compounds of the formula (I) exhibit an excellent plasticizing effect in a rubber processing and moreover they serve effectively as the so-called crosslinking plasticizer which improves the physical properties of vulcanized rubber by the reaction of the plasticizer and the rubber in the course of vulcanization.

The rubber used in the present invention may be any of natural rubbers and synthetic rubbers, for example, isoprene rubbers such as NR and IR, butadiene rubbers such as BR, SBR and NBR, olefin rubbers such as IIR, EPR and EPDM and elastic elastomers such as EVA.

In the present invention, an amount of the ester compound of the formula (I) to be added to the rubber depends upon the kinds of the rubber and the crosslinking plasticizer, and the use of the vulcanized rubber products. The amount is generally 1 to 30 parts by weight, preferably 2 to 20 parts by weight, based on 100 parts by weight of the rubber, in terms of the plasticizing effect and the physical properties of the vulcanized products.

The ester compound of the formula (I) may be applied for a simple sulfur vulcanization of rubber, but it is more desirable to be applied for a peroxide vulcanization of the rubber, because polymerization of the plasticizer itself and crosslinking of the rubber by the plasticizer are effectively carried out using a free radical catalyst particularly an organic peroxide. Further, other compounding ingredients, for example other crosslinking agents, fillers, reinforcing agents, antioxidants and the like may be added.

The vulcanization conditions of the compounded rubber depend upon the compounding and vulcanization system and are generally carried out at a temperature of 100° to 200° C for about 5 to 60 minutes. When the vulcanization is carried out by injection molding, a period of 2 to 3 minutes is sufficient.

As described above, the most remarkable characteristic of the present invention consists in blending the rubber with the ester compound of the formula (I) as a crosslinking plasticizer. The rubber compositions thus obtained are superior to those containing no plasticizer and the compositions containing a common plasticizer such as a process oil. That is, they show extremely large tensile strength and tensile stress after vulcanization as well as very low extraction into solvents such as benzene, and exhibit little or no migration of oils to the surface of vulcanized products nor blooming.

Further, the ester compounds of the formula (I) used in the present invention are solid at room temperature and have at least two rigid aromatic nuclei. Therefore they are very easy to handle in processing as compared with the well-known acryl or methacryl ester type crosslinking plasticizers, and give extremely improved heat resistance and stress at high temperatures to the vulcanized rubber.

The present invention will be illustrated with reference to the following examples, which are not intended to limit the present invention thereto.

EXAMPLE 1

To a 500 ml four-necked flask equipped with a thermometer, reflux condenser, stirrer and 200 ml dropping funnel were added 240 ml of water, 2.4g (0.06 mole) of sodium hydroxide, 0.02g of sodium hydrosulfite as an anti-colorant, 0.05g of trimethylbenzylammonium chloride as a surfactant and 6.7g (0.05 mole) of m-isopropenylphenol. The mixture was made a complete solution. Thereafter, 120 ml of a solution of 5.075g (0.025 mole) of terephthalic acid chloride in methylene chloride was added dropwise from the dropping funnel at room temperature over 10 to 15 minutes during which the solution in the flask was violently stirred. After completion of the addition, the reaction solution was stirred at room temperature for about 2 hours. The methylene chloride layer was separated, washed with two 200 ml portions of 5% aqueous sodium hydroxide solution and three 200 ml portions of water, and dried over anhydrous calcium chloride. On evaporating the methylene chloride, bis-(3-isopropenylphenyl)terephthalate was obtained as an almost white solid.

Yield—8.62g (86.5%),
M. P.—104°–108° C.

EXAMPLE 2

To the same apparatus as in Example 1 were added 240 ml of water, 2.4g (0.06 mole) of sodium hydroxide, 0.02g of sodium hydrosulfite, 0.05g of trimethylbenzylammonium chloride and 6.71g (0.05 mole) of m-isopropenylphenol. The mixture was made a complete solution. Thereafter, 120 ml of a solution of 4.58g (0.025mole) of adipic acid chloride in methylene chloride was added dropwise from the dropping funnel at room temperature over 10 to 15 minutes during which the solution in the flask was violently stirred. After completion of the addition, the reaction solution was stirred at room temperature for about 2 hours and then at 40° C for 1 hour while refluxing the methylene chloride.

On evaporating the methylene chloride and recrystallizing from ethanol, bis-(3-isopropenylphenyl)adipate was obtained as a white solid.

Yield — 7.00g (74.0%),
M. P. — 64°– 67° C.

EXAMPLE 3

The reaction was carried out in the same manner as in Example 1, except that 10.2g of 2,6-diisopropyl-4-vinylphenol was used in place of 6.7g of m-isopropenylphenol. Thus, bis(2,6-diisopropyl-4-vinylphenyl)terephthalate was obtained as a white solid.

EXAMPLE 4

The reaction was carried out in the same manner as in Example 1, except that isophthalic acid chloride was used in place of the terephthalic acid chloride. On evaporating the methylene chloride bis-(3-isopropenylphenyl) isophthalate was obtained as a pale yellow amorphous solid.

Yield — 9.08g (91.1%).

EXAMPLE 5

To the same apparatus as in Example 1 were added 240g of water, 2.4g (0.06 mole) of sodium hydroxide, 0.02g of sodium hydrosulfite, 0.05g of trimethylbenzylammonium chloride and 6.71g (0.05 mole) of m-isopropenylphenol. The mixture was made a complete solution. Thereafter, 120 ml of a solution of 5.99g (0.025 mole) of sebacic acid chloride in methylene chloride was added dropwise from the dropping funnel at room temperature over 10 to 15 minutes during which the solution in the flask was violently stirred. After completion of the addition, the reaction solution was stirred at room temperature for 2.5 hours and then at 40° C for 2 hours while refluxing the methylene chloride.

The methylene chloride layer was separated and washed with two 200 ml portions of 5% aqueous sodium hydroxide solution and three 200 ml portions of water, and then dried over anhydrous calcium chloride. On evaporating the methylene chloride, bis-(3-isopropehylphenyl)sebacate was obtained as a pale yellow solid.

Yield — 7.10g (65.4%).

EXAMPLE 6

To a 500 ml four-necked flask equipped with a thermometer, reflux condenser and stirrer were added 300 ml of xylene, 3.36g (0.025 mole) of m-isopropenylphenol, 2.20g(0.0125 mole) of terephthalic acid, 0.2g of boric acid, 0.1g of solfuric acid and 0.01g of N,N-dimethylaniline. The mixture was heated with stirring for 10 hours during which the resulting water was distilled off as an azeotropic mixture with the xylene and fresh xylene was suitable supplied from a dropping funnel. After completion of the reaction, the reaction solution was washed with three 200 ml portions of 5% aqueous sodium hydroxide solution and two 200 ml portions of water, and then dried over anhydrous calcium chloride. On evaporating the xylene and recrystallizing from ethanol, bis-(3-isopropenylphenyl)-terephthalate was obtained.

Yield — 0.3g (6%).

EXAMPLE 7

Ten grams each of the compounds obtained in Examples 1 to 3 [referred to as test samples (A), (B) and (C), respectively] and the commercially available plasticizer as a reference were blended with the following rubber compound. Each blend was kneaded on a roller and vulcanized at 150° C for 20 minutes. The blank test was also carried out without the compounds or the plasticizer described above. The Mooney viscosity of the rubber compounds and the physical properties of the vulcanized products were measured according to JIS K 6300 and JIS K 6301, respectively. The results are shown in Table 1.

Compounding:

| | |
|---|---|
| SBR No. 1502 | 100 parts |
| Stearic acid | 1 |
| ZnO | 5 |
| White carbon (Nipsil VN$_3$) | 10 |
| Dicumyl peroxide | 2 |

Table 1

| | Test sample | Physical property | Mooney viscosity M$_{1+4}$(100°C) | Tensile strength (kg/cm²) | Elongation (%) | Hardness (HS) | Benzene extraction (%) |
|---|---|---|---|---|---|---|---|
| Example | Test sample | (A) | 45 | 55 | 250 | 58 | 5 |
| | Test sample | (B) | 44 | 51 | 300 | 56 | 3 |
| | Test sample | (C) | 46 | 50 | 280 | 55 | 3 |
| Reference | Circosol 42XH* | | 42 | 19 | 410 | 37 | 93 |

Table 1-continued

| Test sample | Physical property | Mooney viscosity $M_{1+4}(100°C)$ | Tensile strength (kg/cm²) | Elongation (%) | Hardness (HS) | Benzene extraction (%) |
|---|---|---|---|---|---|---|
| example | No addition | 58 | 21 | 350 | 40 | 0 |

*Commercially available process oil (produced by Sunoil Co., Ltd.)

The vulcanized products were extracted with benzene for 8 hours by means of a Soxhlet extractor. The results are shown in Table 1. The extraction ratio was calculated on the basis of the rubber compound for the blank test.

EXAMPLE 8

The rubber compounds before vulcanization obtained in Example 1 were each mixed with carbon black and molded on an injection molding machine with an injection pressure of 1300 kg/cm², an injection time of 1 minute, a vulcanization temperature of 170° C and a vulcanization time of 3 minutes. The molded product containing the process oil showed a bleeding phenomenon immediately after it was taken out of the mold and a tackiness on the surface thereof, while the molded products containing the present compounds did not show these phenomena.

EXAMPLE 9

Five parts each of the test sample (A) as the present compound and the common plasticizer and well-known ester compound as references were blended with the following rubber compound. Each blend was kneaded on a roller and vulcanized at 150° C for 4 minutes. The blank test was also carried out without the compounds described above. The rheometer test of the rubber compounds and the tension test and heat aging test of the vulcanized products were carried out according to JIS K 6301. The results are shown in Table 2.

Compounding:

| SBR A/O. 1500 | 100 parts |
|---|---|
| Stearic acid | 1.5 |
| ZnO | 5 |
| S. R. F. Black | 50 |
| Sulfur | 1.8 |
| N-Cyclohexylbenzothiazyl sulfenamide | 1 |
| Dicumyl peroxide | 0.5 |

The maximum torque, $T_{max}$, obtained by the rheometer test is used as a measure of the stress at high temperatures and the retention obtained by the heat ageing test as a measure of the heat resistance.

Table 2

| Physical property | | Test sample | Example Test sample (A) | Reference example Sundex 790 *1 | ethylene glycol dimethacrylate *2 | No addition |
|---|---|---|---|---|---|---|
| Rheometer test | $T_{max}$ at 150° C (kg.cm) | | 40.5 | 30.6 | 35.2 | 41.3 |
| | $T_{max}$ at 180° C (kg.cm) | | 44.0 | 32.3 | 37.3 | 44.9 |
| Tension test | tensile strength (kg/cm²) | | 250 | 223 | 251 | 245 |
| | elongation (%) | | 510 | 620 | 550 | 500 |
| | tensile stress M300 (kg/cm²) | | 120 | 90 | 115 | 124 |
| | Hardness (HS) | | 65 | 58 | 64 | 65 |
| | Conditions | Retention (%) | | | | |
| Heat ageing test | 100° C × 120 hrs | tensile strength | 95 | 78 | 77 | 80 |
| | | elongation | 78 | 53 | 51 | 55 |

*1 Commercially available process oil (produced by Sunoil Co., Ltd.)
*2 Well-known ester compound

What is claimed is:

1. A compound of the formula (1),

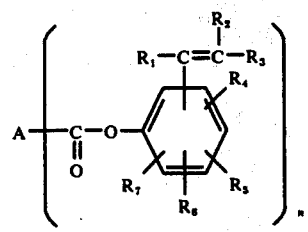

(1)

wherein $R_1$, $R_2$, $R_3$, $R_4$, $R_5$, $R_6$ and $R_7$ are individually a hydrogen atom or a $C_1$–$C_{20}$ alkyl group, A is a hydrocarbon residue, and n is an integer of 2 or 3, provided that when $R_1$ is a methyl group and each of $R_2$, $R_3$, $R_4$, $R_5$, $R_6$ and $R_7$ is a hydrogen atom, the isopropenyl group

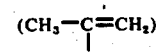

is located at o- or m-position to the oxycarbonyl group

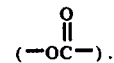

2. The compound according to claim 1, wherein $R_1$, $R_2$ and $R_3$ are individually a hydrogen atom, or a methyl or ethyl group, and $R_4$, $R_5$, $R_6$ and $R_7$ are individually a hydrogen atom or a methyl group.

3. A compound of the formula (1'),

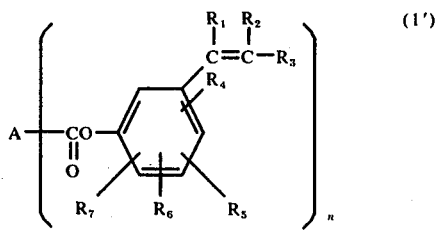

(1')

wherein $R_1$, $R_2$, $R_3$, $R_4$, $R_5$, $R_6$ and $R_7$ are individually a hydrogen atom or a $C_1$–$C_{20}$ alkyl group, A is a hydrocarbon residue, and n is an integer of 2 or 3.

4. The compound according to claim 3, wherein $R_1$, $R_2$ and $R_3$ are individually a hydrogen atom or a methyl or ethyl group, and $R_4$, $R_5$, $R_6$ and $R_7$ are individually a hydrogen atom or a methyl group.

5. Bis(vinylphenyl)terephthalates.
6. Bis(2- or 3-isopropenylphenyl)terephthalate.
7. Tris(vinylphenyl)trimellitates.
8. Tris(2- or 3-isopropenylphenyl)trimellitate.
9. Bis(vinylphenyl)adipates.
10. Bis(2- or 3-isopropenylphenyl)adipate.
11. Bis(vinylphenyl)sebacates.
12. Bis(2- or 3-isopropenylphenyl)sebacate.
13. Bis(isopropenyldimethylphenyl)adipates.
14. Bis(isopropenyldimethylphenyl)terephthalates.
15. Tris(isopropenyldimethylphenyl)trimellitates.
16. Bis(vinylphenyl)fumarates.
17. Bis(2- or 3-isopropenylphenyl)fumarate.
18. Bis(isopropenyltrimethylphenyl)fumalates.
19. Bis(isopropenyldimethylphenyl)isophthalates.
20. Bis(2- or 3-isopropenylphenyl)isophthalate.
21. Bis(isopropenyldimethylphenyl)isophthalates.
22. Bis(2,6-diisopropyl-4-vinylphenyl)terephthalate.
23. A method for producing the compound of claim 1, which comprises reacting a phenol compound of the formula (2),

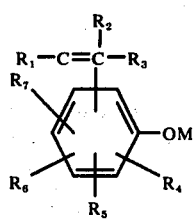

(2)

wherein $R_1$, $R_2$, $R_3$, $R_4$, $R_5$, $R_6$ and $R_7$ are as defined in claim 1, and M is an hydrogen atom or an alkali metal belonging to Group I of Mendelejeff's Periodic Table, provided that when $R_1$ is a methyl group and each of $R_2$, $R_3$, $R_4$, $R_5$, $R_6$ and $R_7$ is a hydrogen atom, the isopropenyl group

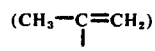

is located at o- or m-position to the -OM group, with a polycarboxylic acid or a reactive derivative thereof, of the formula (3), A–(COY)$_n$     (3)

wherein A and n are as defined above, and Y is a hydroxyl group or a $C_1$–$C_{20}$ alkoxy group or a halogen atom.

24. A rubber composition comprising at least one of aromatic polyvinyl compounds of the formula (I),

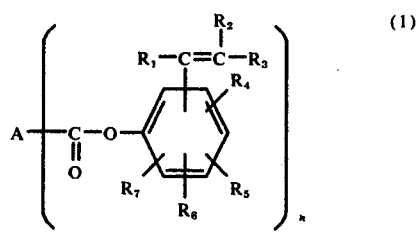

(1)

wherein $R_1$, $R_2$, $R_3$, $R_4$, $R_5$, $R_6$ and $R_7$ are individually a hydrogen atom or a $C_1$–$C_{20}$ alkyl group, A is a hydrocarbon residue, and n is an integer of 2 or 3.

25. The rubber composition according to claim 23, wherein the aromatic polyvinyl compound is a compound of the formula (I), provided that when $R_1$ is a methyl group and each of $R_2$, $R_3$, $R_4$, $R_5$, $R_6$ and $R_7$ is a hydrogen atom, the isopropenyl group

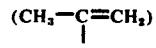

is located at o- or m-position to the oxycarbonyl group

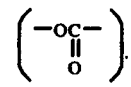

26. The rubber composition according to claim 23, wherein the amount of the compound of the formula (I) is 1 to 30 parts by weight based on 100 parts by weight of the rubber.

27. A method for solftening rubber, which comprises mixing the rubber with the aromatic polyvinyl compound of the formula (I) as defined in claim 23, 28. In a method for vulcanizing rubber, an improvement which comprises adding the aromatic polyvinyl compound of the formula (I) as defined in claim 23.

* * * * *